United States Patent [19]

Rosen et al.

[11] Patent Number: 5,732,919

[45] Date of Patent: Mar. 31, 1998

[54] STOWABLE MONITOR LIFT APPARATUS

[75] Inventors: John B. Rosen, Eugene; James C. Dezotell, Creswell; Jeffrey S. Chapman, Veneta, all of Oreg.

[73] Assignee: Advanced Multimedia Products Corporation

[21] Appl. No.: 782,609

[22] Filed: Jan. 13, 1997

[51] Int. Cl.⁶ ............................................. E04G 3/00
[52] U.S. Cl. ................................. 248/274.1; 248/917
[58] Field of Search ............................ 248/274.1, 917, 248/919, 278.1, 291.1, 292.13, 292.14, 297.21; 297/145, 188.17

[56] References Cited

U.S. PATENT DOCUMENTS

| | | | |
|---|---|---|---|
| 3,917,209 | 11/1975 | Adams | 248/421 |
| 4,381,714 | 5/1983 | Henneberg et al. | 248/188.5 |
| 4,382,573 | 5/1983 | Aondetto | 248/421 |
| 4,573,657 | 3/1986 | Sakamoto | 248/421 |
| 5,145,136 | 9/1992 | McConnell | 248/631 |
| 5,181,771 | 1/1993 | Robak et al. | 312/248 |
| 5,374,104 | 12/1994 | Moore et al. | 248/292.13 X |
| 5,433,376 | 7/1995 | Kueshner | 248/292.13 X |
| 5,547,248 | 8/1996 | Marechal | 248/278.1 X |
| 5,598,788 | 2/1997 | Jonker | 248/631 X |

FOREIGN PATENT DOCUMENTS 19 20 696   6/1978   Germany.

Primary Examiner—Ramon O. Ramirez
Attorney, Agent, or Firm—Kolisch, Hartwell, Dickinson, McCormack & Heuser

[57] ABSTRACT

A stowable monitor life apparatus is described. The invented lift apparatus employs two different biasing mechanisms for deployment of a monitor support structure, thereby reducing the space required to house the apparatus with its associated monitor while promoting quick and easy deployment and stowage of the monitor within the system's housing. Preferably, the biasing mechanisms take the form of a pivotal gas spring in combination with a coil spring, whereby the coil spring acts along a generally vertical axis to partially deploy the monitor support structure and to pivot the nominally horizontal gas spring into an inclined orientation that enables it to complete the lifting of the monitor support structure. Thus, the two springs assist one another upon manual deployment via a pushbutton release mechanism. By pivoting the gas spring from a nominally horizontal orientation in which it exerts no upward force on the monitor support structure to an inclined orientation in which it exerts substantial upward force thereon, quick deployment is obtained while substantial vertical space savings are realized.

11 Claims, 4 Drawing Sheets

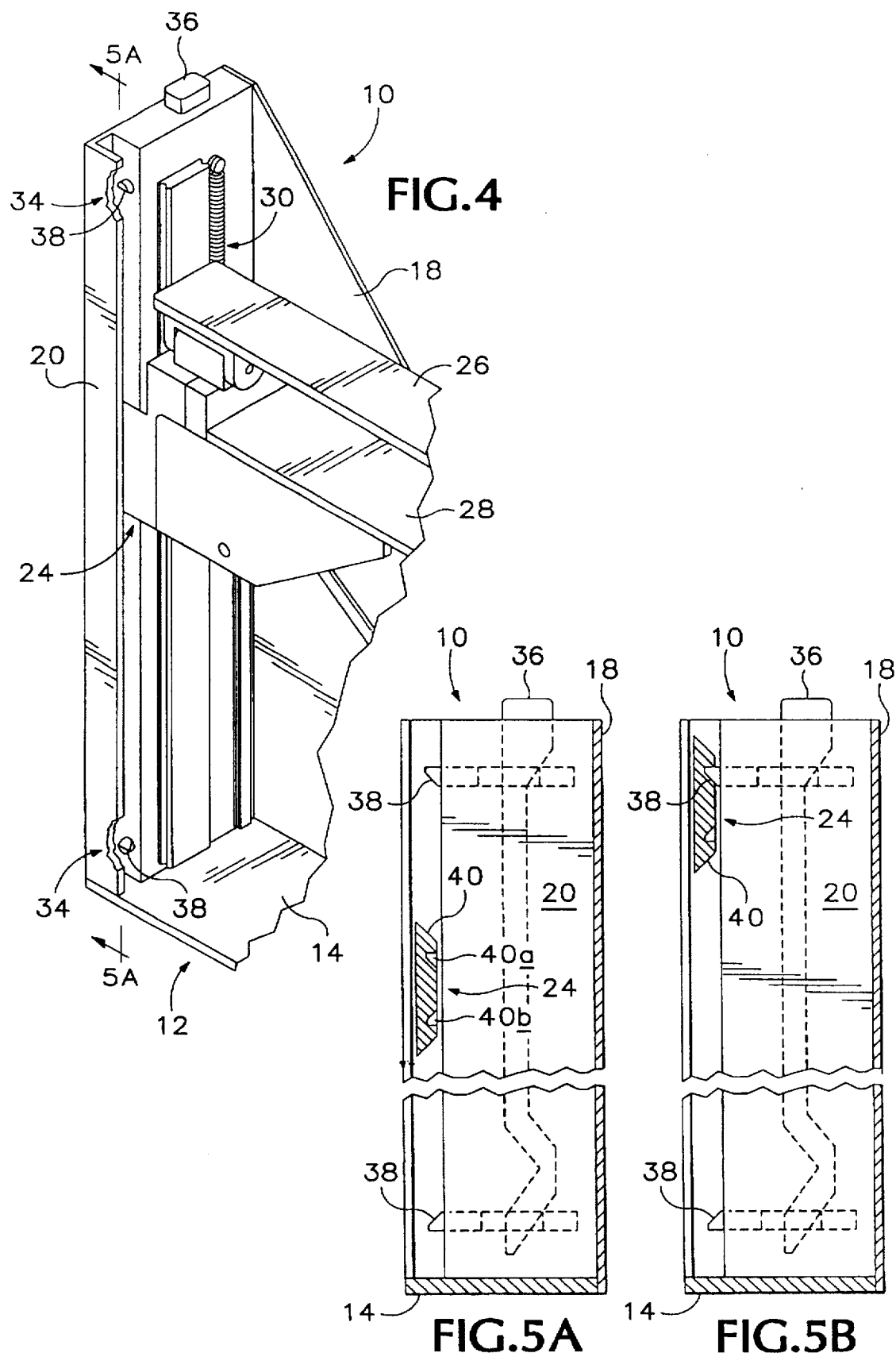

5,732,919

STOWABLE MONITOR LIFT APPARATUS

BACKGROUND AND SUMMARY OF THE INVENTION

This invention relates generally to display monitor lift systems useful where space is limited and the monitor may need to be stowed out of the way when not in use. More particularly, it concerns compact stowable monitor lift apparatus that is spring-assisted to make deployment and stowing quick and convenient.

In confined places such as aircraft passenger compartments, space is at a premium. Appliances such as flat-panel television and display monitors are important to many travelers, but must be provided with the capability of being stowed out of the way of the passengers and crew when not in use. Deployable/stowable appliances must be quickly and easily positionable by the user, however, and should be as nearby as possible and preferably built in to the passenger's seat or an adjacent structure. Because of the relatively low-slung seats that are typical of most commercial and private aircraft, unusual vertical space limitations further constrain the design of what will be referred to herein as stowable monitor lift apparatus.

Briefly, the invented lift apparatus employs two different, but cooperative, biasing mechanisms for deployment of a monitor support structure, thereby reducing the space required to house the apparatus with its associated monitor while promoting quick and easy deployment and stowage of the monitor within the system's housing. Preferably, the biasing mechanisms take the form of a pivotal gas spring in combination with a coil spring, whereby the coil spring acts along a generally vertical axis to partially deploy the monitor support structure and to pivot the nominally horizontally oriented gas spring into an inclined orientation that enables it to complete the lifting of the monitor support structure. Thus, the two springs assist one another upon manual deployment via a pushbutton release mechanism. By pivoting the gas spring from a nominally horizontal orientation in which it exerts no upward force on the monitor support structure to an inclined orientation in which it exerts substantial upward force thereon, quick deployment is obtained while substantial vertical space savings are realized.

These and other advantages and features of the invention will become more fully apparent when the detailed description below is read with reference to the accompanying drawings.

BRIEF DESCRIPTION OF THE DRAWINGS

FIG. 4 is a fragmentary, isometric rearward view of the apparatus showing in cutaway detail the catch mechanism that forms part of the invention.

FIGS. 5A and 5B are fragmentary, cross-sectional rear elevations taken generally along the lines 5A—5A in FIG. 4 and show the cooperative members of the catch mechanism.

DETAILED DESCRIPTION OF THE PREFERRED EMBODIMENT

Figure 1:
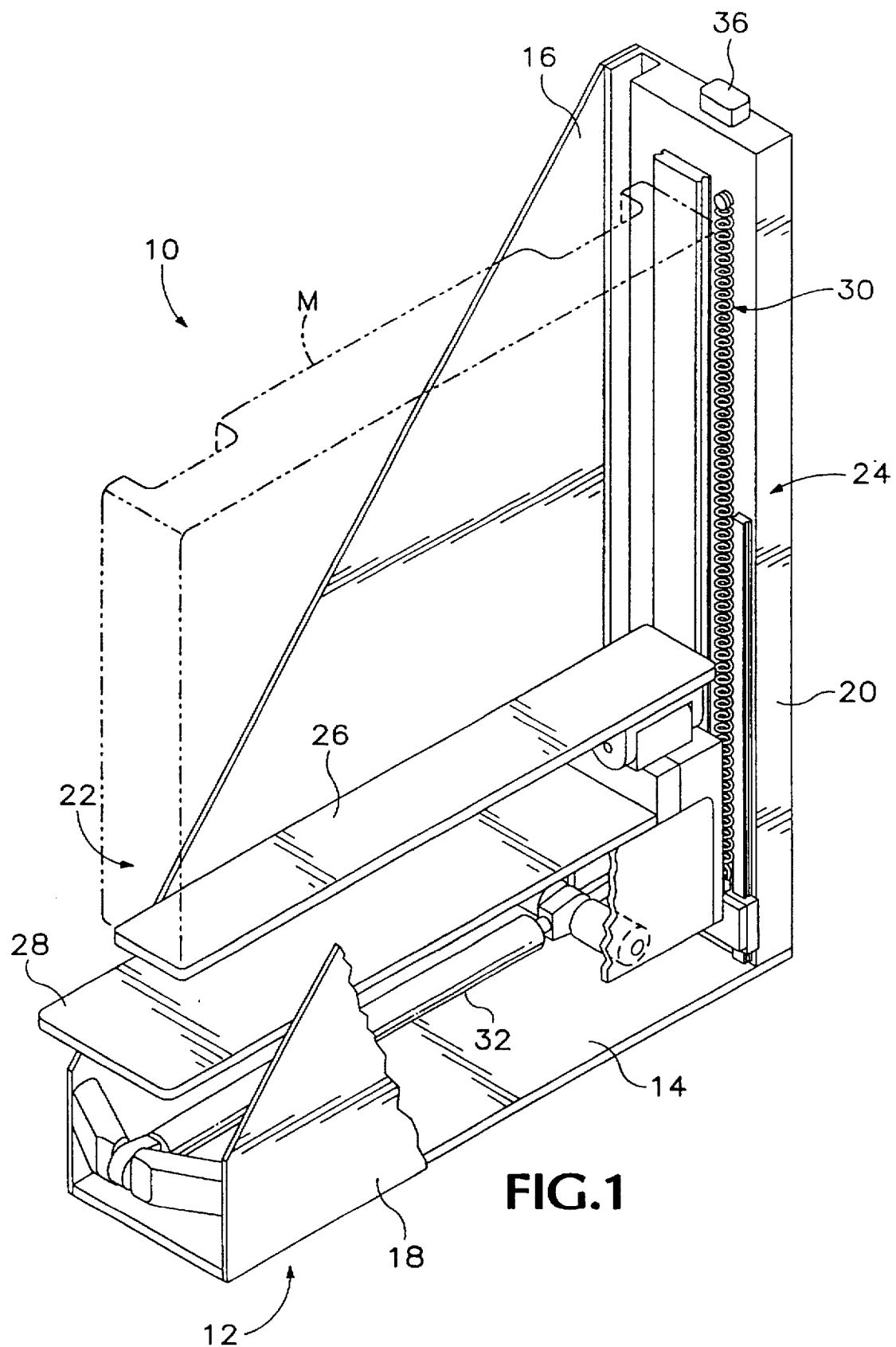
FIG. 1 is an isometric frontal view of the invented apparatus in its stowage position made in accordance with its preferred embodiment, with a display monitor shown in phantom lines.

Referring to FIG. 1, the invented apparatus is shown in isometric view in its preferred embodiment. Apparatus 10 may be seen to include a generally triangular (in side view), substantially open frame 12 including a base plate 14, left and right sidewalls 16, 18 and an endwall 20. Apparatus 10 also preferably includes a spring-loaded monitor mounting structure, indicated generally at 22, for securing a monitor or the like in a viewable orientation.

Figure 2:
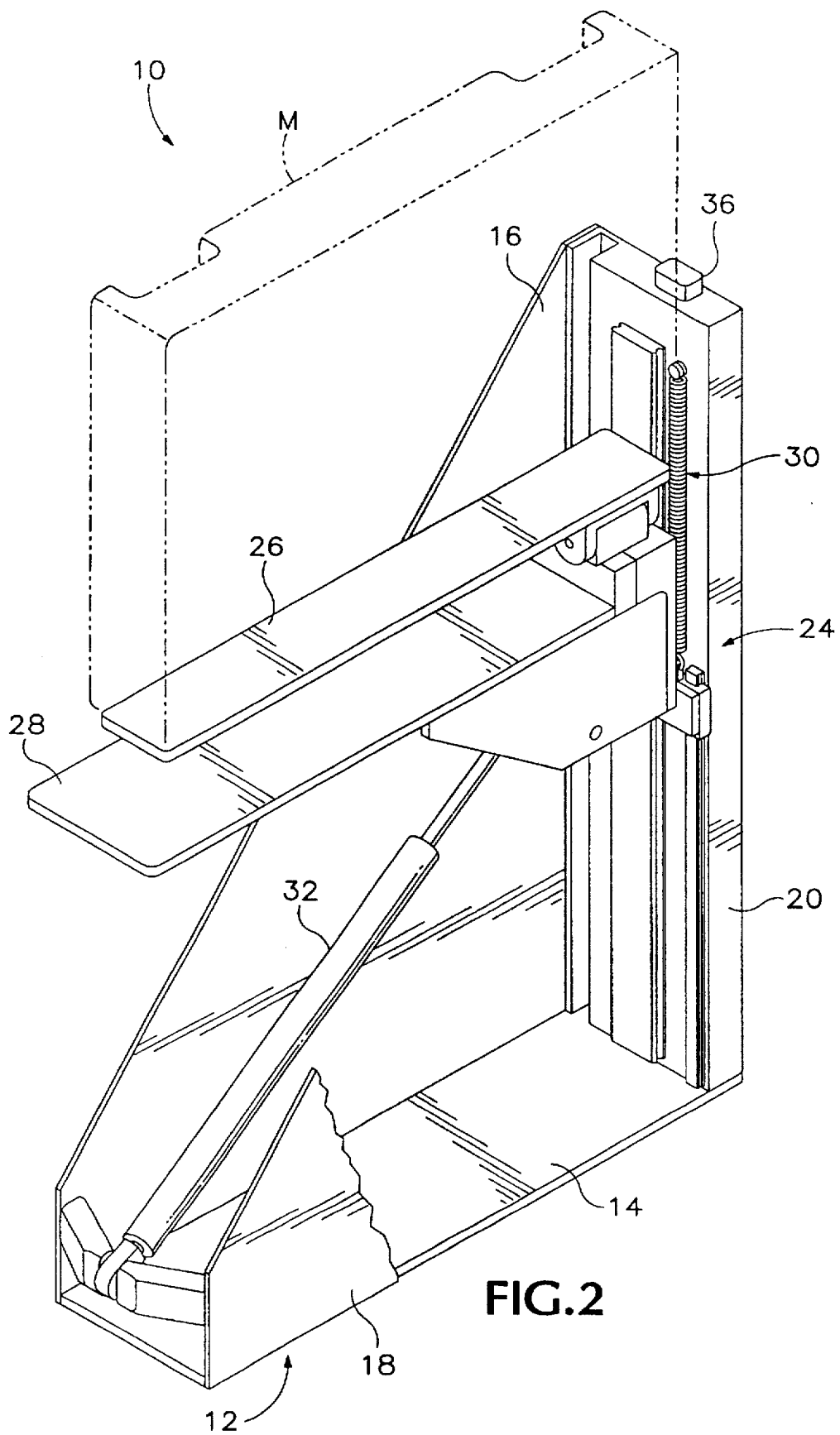
FIG. 2 is an isometric view corresponding with FIG. 1, but showing the invented apparatus partially deployed.
Figure 3:
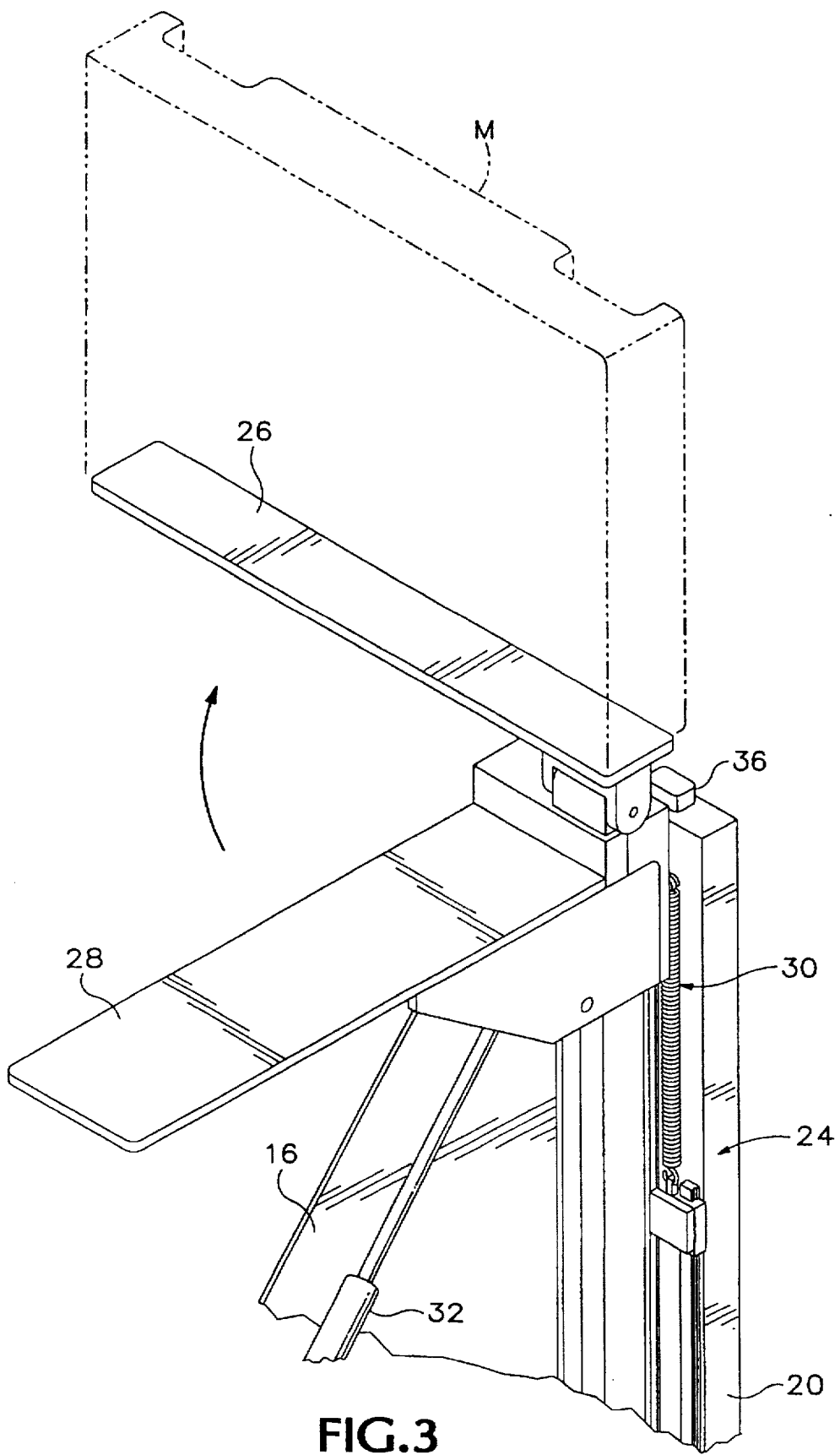
FIG. 3 is a fragmentary, isometric view corresponding with FIGS. 1 and 2, but showing the invented apparatus fully deployed for viewing of the display monitor, which is pivoted for viewing.

Apparatus 10 also preferably includes a lift structure, indicated generally at 24, operatively connected to mounting structure 22, lift structure 24 being capable of moving mounting structure 22 and a monitor mounted thereon, generally vertically along endwall 20, from a first stowed position of such a monitor (shown in FIG. 1) within frame 12 to a second deployed, or presented, position of such a monitor above enclosure 12 (shown in FIG. 3). A monitor, indicated in FIGS. 1 through 3 in dash-dot-dot lines at M, may be mounted on a mounting arm 26 rotatable in a generally horizontal plane by its sleeve bearing mounting above a deck 28, arm 26 and deck 28 forming a part of lift structure 24. Mounting arm 26 is pivotable, preferably through 360° rotation, only when lift structure 24 is in its fully deployed position as shown in FIG. 3. It may be appreciated from FIGS. 1 and 2 that, when lift structure 24 is in its stowed or partly deployed position, left and right sidewalls 16, 18 (the latter shown only fragmentarily) prevent more than slight rotation thereof in the stowed position of the apparatus.

Lift structure 24 may be seen by reference to FIG. 2 to include a preferably elongate, generally vertically oriented, biasing member indicated at 30—e.g. a biasing member preferably including a coil spring under tension—for moving mounting structure 22 (and any monitor M mounted thereon) from the first stowed position through a second intermediate position. It may be seen from FIG. 2 that, in this intermediate position, coil spring 30 is under substantially less tension than when mounting structure 22 is in its stowed position. In this phase of operation of apparatus 10, a gas spring device indicated at 32 with its cylinder suitably, pivotally connected to frame 12 and with its extensible rod pivotally connected to lift structure 24 has been pivoted by the force of coil spring 30 in an upward, inward arc so that it no longer is generally horizontally oriented but instead is oriented at an inclined angle.

Those of skill in the art will appreciate that, when gas spring device 32 is generally horizontally oriented relative to the generally vertical lift axis, i.e. when it is the first stowed position, it is relatively less effective in lifting mounting structure 22 than when it is in its relatively more effective inclined orientation corresponding through the intermediate position shown in FIG. 2. At this phase of the operation of apparatus 10, while coil spring 30 is relatively less effective in lifting mounting structure 22, nevertheless gas spring device 32 is relatively more effective in lifting mounting structure 22. Thus, it may be seen that it is the cooperation of coil spring 30 and gas spring device 32 that effectively elevates mounting structure 22 for viewing of monitor M. Yet gas spring device 32 takes up far less vertical space, which is typically at a premium, because of its pivotal orientation and cooperation with coil spring 30.

Referring now to FIG. 3, it may be seen that the continued force exerted by gas spring device 32 on mounting structure 22 as it pivots moves the latter from the intermediate position shown in FIG. 2 to a second presented position of the mounting structure 22 shown in FIG. 3. This is because gas spring device 32 is pivoted by coil spring 30, via the pivotal connection between gas spring device 32 and lift structure 24, during movement of mounting structure 22 from its first stowed position in which it under compression through its intermediate position, whereafter it is effective—by the expansion of the compressed gas within its cylinder—in urging mounting structure 22 into further elevation to the second presented position in which monitor M is rotatable (as indicated by an arced arrow) and viewable. Biasing member 30 and gas spring device 32 cooperate with one another during two distinct phases of a lift cycle to elevate said mounting structure (and a monitor mounted thereon) to the second presented position from the first stowed position.

Turning now briefly to FIGS. 4, 5A and 5B, the catch mechanism of invented apparatus 10 will be described in detail. (First, it is noted that in FIGS. 4, 5A and 5B sidewall 16 is removed from frame 12 for the sake of clarity.) A releasable stop member, or a catch, 34 preferably is provided for selectively locking mounting structure 22, in the first stowed position illustrated in FIG. 1, against the lifting force of biasing member 30. Preferably, catch 34 is released by the depression of a pushbutton 36 located preferably on the top surface of endwall 20 in a position that is convenient for a person wishing to become a viewer of monitor M. Those of skill in the art will appreciate that catch 34 may be of any conventional design whereby, for example, it includes one or more latch members 38 engaging a suitably placed notches 40a, 40b formed within a preferably cross-sectionally trapezoid shaped member 40 also forming a part of lift structure 24.

Preferably, as is suggested by the intermediate and deployed phases of operation of apparatus 10 shown, respectively, in FIGS. 5A and 5B, member 40 extends from lift structure 24 into a vertical channel formed within endwall 20 of frame 12 into which latch members 38 extendably and retractably encroach near the top and bottom of apparatus 10. It will be appreciated that latch members 38 preferably are tensioned (by a coil spring, not shown) into their extensive positions shown in FIGS. 5A and 5B, and retract from the channel and away from member 40 upon depression of pushbutton 36 to manually raise and lower lift structure 24, e.g., via the cooperation of slotted holes in members 38 through which extend camming features operatively moveable by pushbutton 36 (as suggested by phantom lines).

Those of skill in the art will appreciate that the lower one of releasable latch members 38 normally maintains lift structure 24 in its first stowed position shown in FIG. 1, and that pushbutton 36 us operatively connected with catch 34 for releasing the same when the pushbutton is actuated, as by depressing it. Preferably, the upper one of releasable latch members 38 also normally maintains lift structure 24 in its second presented position shown in FIG. 3 and detailed in FIG. 5B, and pushbutton 36 operatively connected therewith allows the user to release the same when the pushbutton is actuated.

Those skilled in the art will appreciate that one or more stop or latch members or catches forming a part of catch 34 may be used to maintain the first and second positions of lift structure 24 so that, within the spirit and scope of the invention, a first releasable stop member would be for normally maintaining the lift structure in its first stowed position and a second releasable stop member would be for otherwise maintaining the lift structure in its second presented position, with the stop members both being releasable by the actuation of one or more pushbuttons operatively connected therewith. Other variations in the way in which one or more stop members and one or more pushbuttons may cooperate to securely maintain the lift structure in its stowed and presented positions are contemplated and are within the scope of the invention.

OPERATION

In operation, it will be understood that the invented apparatus may be used to deploy display monitor M by simply depressing pushbutton 36. This operation releases catch 34 and permits coil spring 30 under tension to elevate monitor-mounting structure 22 vertically and to lift the pivotal end of connected gas spring device 32 in an upward, inward arc toward an intermediate position of the mounting structure in which gas spring device 32 is effective smoothly to continue lifting the mounting structure upwardly toward its terminal, fully deployed position. In this fully deployed position, the display monitor may readily be rotated into a desired viewing position. To stow the apparatus, the passenger again depresses pushbutton 36 and pushes downwardly on monitor M until catch 34 locks apparatus 10 in its stowed position within a compact housing into which apparatus 10 fits.

While the present invention has been shown and described with reference to the foregoing preferred embodiment, it is to be understood by those of skill in the art that other changes in form and detail may be made therein without departing from the spirit and scope of the invention as defined in the appended claims.

We claim:

1. Lift apparatus for presenting a stowable monitor, the apparatus comprising:

mounting structure for securing a monitor in a viewable orientation;

lift structure operatively connected to said mounting structure capable of moving said mounting structure from a first stowed position of such a monitor within an enclosure to a second presented position of such a monitor above the enclosure, said lift structure including a biasing member for moving said mounting structure in a first direction from the first stowed position through an intermediate position and a gas spring device for moving said mounting structure in said same first direction from the intermediate position to the second presented position, said gas spring device being pivoted by said biasing member during such movement to the intermediate position from a first relatively less effective orientation relative to the lift axis to a relatively more effective orientation relative thereto, said biasing member and said gas spring device cooperating with one another to elevate said mounting structure and a monitor mounted thereon to the second presented position from the first stowed position.

2. Lift apparatus for presenting a stowable monitor, the apparatus comprising:

mounting structure for securing a monitor in a viewable orientation;

lift structure operatively connected to said mounting structure capable of moving said mounting structure from a first stowed position of such a monitor within an enclosure to a second presented position of such a monitor above the enclosure, said lift structure including a biasing member for moving said mounting structure from the first stowed position through an intermediate position and a gas spring device for moving said mounting structure from the intermediate position to the second presented position, said gas spring device being pivoted by said biasing member during such movement to the intermediate position from a first relatively less effective orientation relative to the lift axis to a relatively more effective orientation relative thereto, said biasing member and said gas spring device cooperating with one another to elevate said mounting structure and a monitor mounted thereon to the second presented position from the first stowed position; and a releasable stop member for selectively locking said mounting structure in the first stowed position against the lifting force of said biasing member.

3. Lift apparatus for presenting a stowable monitor, the apparatus comprising:

mounting structure for securing a monitor in a viewable orientation;

lift structure operatively connected to said mounting structure capable of moving said mounting structure from a first stowed position of such a monitor within an enclosure to a second presented position of such a monitor above the enclosure, said lift structure including a biasing member for moving said mounting structure from the first stowed position through an intermediate position and a gas spring device for moving said mounting structure from the intermediate position to the second presented position, said gas spring device is oriented generally horizontally when the structure is in the first stowed position, said gas spring device being pivoted by said biasing member during such movement to the intermediate position from a first relatively less effective orientation relative to the lift axis to a relatively more effective orientation relative thereto, said biasing member and said gas spring device cooperating with one another to elevate said mounting structure and a monitor mounted thereon to the second presented position from the first stowed position.

4. The apparatus of claim 3, wherein said biasing member is elongate and is oriented generally vertically.

5. The apparatus of claim 4, wherein said biasing member includes a coil spring under tension.

6. The apparatus of claim 5, wherein said gas spring device is under compression when the structure is in the first stowed position.

7. Lift apparatus for presenting a stowable monitor, the apparatus comprising:

mounting structure for securing a monitor in a viewable orientation;

lift structure operatively connected to said mounting structure capable of moving said mounting structure from a first stowed position of such a monitor within an enclosure to a second presented position of such a monitor above the enclosure, said lift structure including a biasing member for moving said mounting structure from the first stowed position through an intermediate position and a gas spring device for moving said mounting structure from the intermediate position to the second presented position, said gas spring device being pivoted by said biasing member during such movement to the intermediate position from a first relatively less effective orientation relative to the lift axis to a relatively more effective orientation relative thereto, said biasing member and said gas spring device cooperating with one another to elevate said mounting structure and a monitor mounted thereon to the second presented position from the first stowed position; and a releasable catch for normally maintaining said lift structure in its first stowed position.

8. The apparatus of claim 7 which further comprises a pushbutton operatively connected with said catch for releasing the same when said pushbutton is actuated.

9. Lift apparatus for presenting a stowable monitor, the apparatus comprising:

mounting structure for securing a monitor in a viewable orientation;

lift structure operatively connected to said mounting structure capable of moving said mounting structure from a first stowed position of such a monitor within an enclosure to a second presented position of such a monitor above the enclosure, said lift structure including a biasing member for moving said mounting structure from the first stowed position through an intermediate position and a gas spring device for moving said mounting structure from the intermediate position to the second presented position, said gas spring device being pivoted by said biasing member during such movement to the intermediate position from a first relatively less effective orientation relative to the lift axis to a relatively more effective orientation relative thereto, said biasing member and said gas spring device cooperating with one another to elevate said mounting structure and a monitor mounted thereon to the second presented position from the first stowed position; and a releasable catch for normally maintaining said lift structure in its second presented position.

10. The apparatus of claim 9 which further comprises a pushbutton operatively connected with said catch for releasing the same when said pushbutton is actuated.

11. Lift apparatus for presenting a stowable monitor, the apparatus comprising:

mounting structure for securing a monitor in a viewable orientation;

lift structure operatively connected to said mounting structure capable of moving said mounting structure from a first stowed position of such a monitor within an enclosure to a second presented position of such a monitor above the enclosure, said lift structure including a biasing member for moving said mounting structure from the first stowed position through an intermediate position and a gas spring device for moving said mounting structure from the intermediate position to the second presented position, said gas spring device being pivoted by said biasing member during such movement to the intermediate position from a first relatively less effective orientation relative to the lift axis to a relatively more effective orientation relative thereto, said biasing member and said gas spring device cooperating with one another to elevate said mounting structure and a monitor mounted thereon to the second presented position from the first stowed position; and a first releasable stop member for normally maintaining said lift structure in its first stowed position and a second releasable stop member for otherwise maintaining said lift structure in its second presented position, with said stop members being releasable by the actuation of a pushbutton operatively connected therewith.

\* \* \* \* \*